US008645433B2

(12) United States Patent
Shi et al.

(10) Patent No.: US 8,645,433 B2
(45) Date of Patent: Feb. 4, 2014

(54) DISTRIBUTED NETWORK CONSTRUCTION AND STORAGE METHOD, APPARATUS AND SYSTEM

(75) Inventors: Guangyu Shi, Shenzhen (CN); Hao Gong, Shenzhen (CN); Jian Chen, Shenzhen (CN); Lingyuan Fan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 3 days.

(21) Appl. No.: 12/639,667

(22) Filed: Dec. 16, 2009

(65) Prior Publication Data
US 2010/0169280 A1 Jul. 1, 2010

(30) Foreign Application Priority Data
Dec. 26, 2008 (CN) .......................... 2008 1 0241867

(51) Int. Cl.
*G06F 17/30* (2006.01)
(52) U.S. Cl.
USPC .......................................................... 707/803
(58) Field of Classification Search
USPC .......................................... 707/640, 803, 812
See application file for complete search history.

(56) References Cited

U.S. PATENT DOCUMENTS

| 6,909,965 | B1 * | 6/2005 | Beesley et al. ................ 701/209 |
| 7,162,253 | B2 * | 1/2007 | Vare et al. .................. 455/456.2 |
| 2004/0233857 | A1 * | 11/2004 | Wimmer et al. .............. 370/254 |
| 2004/0249970 | A1 | 12/2004 | Castro et al. |
| 2007/0088811 | A1 * | 4/2007 | Chan et al. .................... 709/223 |
| 2011/0136501 | A1 * | 6/2011 | Britt et al. .................. 455/456.1 |
| 2011/0238625 | A1 * | 9/2011 | Hamaguchi et al. .......... 707/640 |

OTHER PUBLICATIONS

European Patent Office, Extended European Search Report in European Application No. 09180096.1 (May 3, 2010).
State Intellectual Property Office of the People's Republic of China, 1st Office Action in Chinese Application No. 200810241867.0 (Feb. 13, 2012).
Zhou et al., "Locaton-Based Node IDs: Enabling Explicit Locality in DHTs," Retrieved from the Internet: URL: http://www.pdl.cmu.edu/PDL-FTP/stray/CMU-CS-03-171.pdf> retrieved on Apr. 12, 2010, XP002577446 (Sep. 1, 2003).
Ahullo et al., "Supporting Geographical Queries Onto DHTs," 33rd IEEE Conference on Local Computer Networks (LCN 2008), (Oct. 14-17, 2008), Montreal, QUE, Canada, IEEE, Piscataway, NJ, USA, Oct. 14, 2008, pp. 435-442, XP031355877, ISBN: 978-1-4244-2412-2.

(Continued)

*Primary Examiner* — Joshua Bullock
(74) *Attorney, Agent, or Firm* — Leydig, Voit & Mayer, Ltd.

(57) ABSTRACT

The disclosure relates to distributed network communications, and in particular, to a distributed network construction method and apparatus, a distributed data storage method and apparatus, and a distributed network system. When a node joins a distributed network, the ID of the node is determined according to the geographic location information about the node. Therefore, all the nodes in the same area belong to the same ID range, and the node IDs are allocated according to the area. Because the node IDs are determined according to the area, the local data may be stored in the node in the area according to the geographic information, inter-area data access is reduced. Therefore, the method, the apparatus, and the system provided herein reduce the data load on the backbone network, balance the data traffic and the bandwidth overhead of the entire network, and reduce the network instability.

4 Claims, 8 Drawing Sheets

(56) References Cited

OTHER PUBLICATIONS

Office Action in corresponding in Chinese Patent Application No. 200810241867.0 (Feb. 13, 2012).
Extended European Search Report in corresponding European Patent Application No. 09180096.1 (May 4, 2010).

$1^{st}$ Office Action in corresponding European Patent Application No. 0918096.1 (Jan. 7, 2013).
Zhou et al., "Location-based Node IDs: Enabling Explicit Locality in DHTs," Sep. 2003, School of Computer Science, Carnegie Mellon University, Pittsburgh, Pennsylvania.
Ahullo et al., "Supporting Geographical Queries onto DHTs," 2008, IEEE, New York, New York.

* cited by examiner

DISTRIBUTED NETWORK CONSTRUCTION AND STORAGE METHOD, APPARATUS AND SYSTEM

CROSS-REFERENCE TO RELATED APPLICATION

This application claims priority to Chinese Patent Application No. 200810241867.0, filed on Dec. 26, 2008, which is hereby incorporated by reference in its entirety.

FIELD OF THE INVENTION

The disclosure relates to distributed network communications, and in particular, to a distributed network construction method and apparatus, a distributed data storage method and apparatus, and a distributed network system.

BACKGROUND OF THE INVENTION

In a distributed data storage system, the reliability and validity of data storage are generally ensured by redundancy backup. The distributed data redundancy storage solution in the prior art divides data into fragments, and stores the data on multiple nodes concurrently. The data can be read and written through multiple nodes concurrently in the data exchange. The redundancy backup of data on the network in the prior art is generally implemented through sequential redundancy backup and halved space redundancy backup.

On a distributed storage network, data is generally area-specific, and the data is distributed unevenly among different areas. The distributed storage solution in the prior art generally considers only reliability, and the data is stored in fragments on the nearest node according to the Hash result. Different nodes for storing different fragments of data may belong to different local networks. In the process of reading or writing data, the data needs to be read or written over different local networks. Therefore, the load overhead of some nodes and some network links may be very high and the overhead of other nodes may be very low in the data exchange. Such imbalance leads to imbalance of traffic and data storage on the entire distributed storage network, and increases the network instability.

SUMMARY OF THE INVENTION

Embodiments of the disclosure provides a distributed network construction method, a distributed data storage method, a distributed network construction apparatus, a distributed data storage apparatus, and a distributed network system to reduce the network load, to balance the data traffic and bandwidth overhead among all network links, and to reduce the network instability.

A distributed network construction method includes:
obtaining geographic location information about a node;
determining the home area of the node according to the geographic location information about the node, and determining the ID space of the node according to the home area of the node, where different areas correspond to different ID spaces; and
selecting a value in the determined ID space to construct the ID of the node.

A distributed data storage method includes:
obtaining geographic location information about data;
determining the storage area of the data according to the geographic location information about the data, and calculating the key value of the data;
selecting a local node in the storage area according to the key value; and
storing the data into the local node.

A distributed network construction apparatus includes:
an obtaining module, adapted to obtain geographic location information about a node;
a selecting module, adapted to determine the home area of the node according to the geographic location information about the node obtained by the obtaining module, and determine the ID space of the node according to the home area of the node, where different areas correspond to different ID spaces; and
a constructing module, adapted to select a value in the ID space determined by the selecting module to construct the ID of the node.

A distributed data storage apparatus includes:
an obtaining module, adapted to obtain geographic location information about data, and determine the storage area of the data according to the geographic location information about the data;
a Hash module, adapted to calculate the key value of the data; and
a storage module, adapted to select a local node in the storage area determined by the obtaining module according to the key value calculated by the Hash module, and store the data into the local node.

A distributed network system includes:
a first node, adapted to obtain geographic location information about the first node or another node, determine the home area of the node according to the geographic location information about the node, and determine the ID space of the node according to the home area of the node, where different areas correspond to different ID spaces, and select a value in the determined ID space to construct the ID of the node.

As seen from the foregoing technical solution, when the node joins the distributed network, the ID of the node is determined according to the geographic location information about the node. Therefore, all nodes in the same area belong to the same ID range, and the IDs of the nodes are allocated according to the area. Because the IDs of the nodes are determined according to the area, the local data may be subsequently stored on the node in the area corresponding to the geographic information about the node, thus reducing inter-area data access. The method, the apparatus, and the system provided herein reduce the data load on the backbone network, balance the data traffic and the bandwidth overhead of the entire network, and reduce the network instability.

BRIEF DESCRIPTION OF THE DRAWINGS

To make the technical solution under the disclosure or the prior art clearer, the accompanying drawings for illustrating the embodiments of the disclosure or the prior art are outlined below. Evidently, the accompanying drawings are exemplary only, and those skilled in the art can derive other drawings from such accompanying drawings without creative work.

DETAILED DESCRIPTION OF THE INVENTION

The technical solution under the disclosure is expounded below with reference to the accompanying drawings. Evidently, the embodiments herein are exemplary only, and are not all of the embodiments of the disclosure. Those skilled in the art can derive other embodiments from the embodiments given herein without creative work, and all such embodiments are covered in the scope of protection of the disclosure.

First Embodiment

Figure 1:
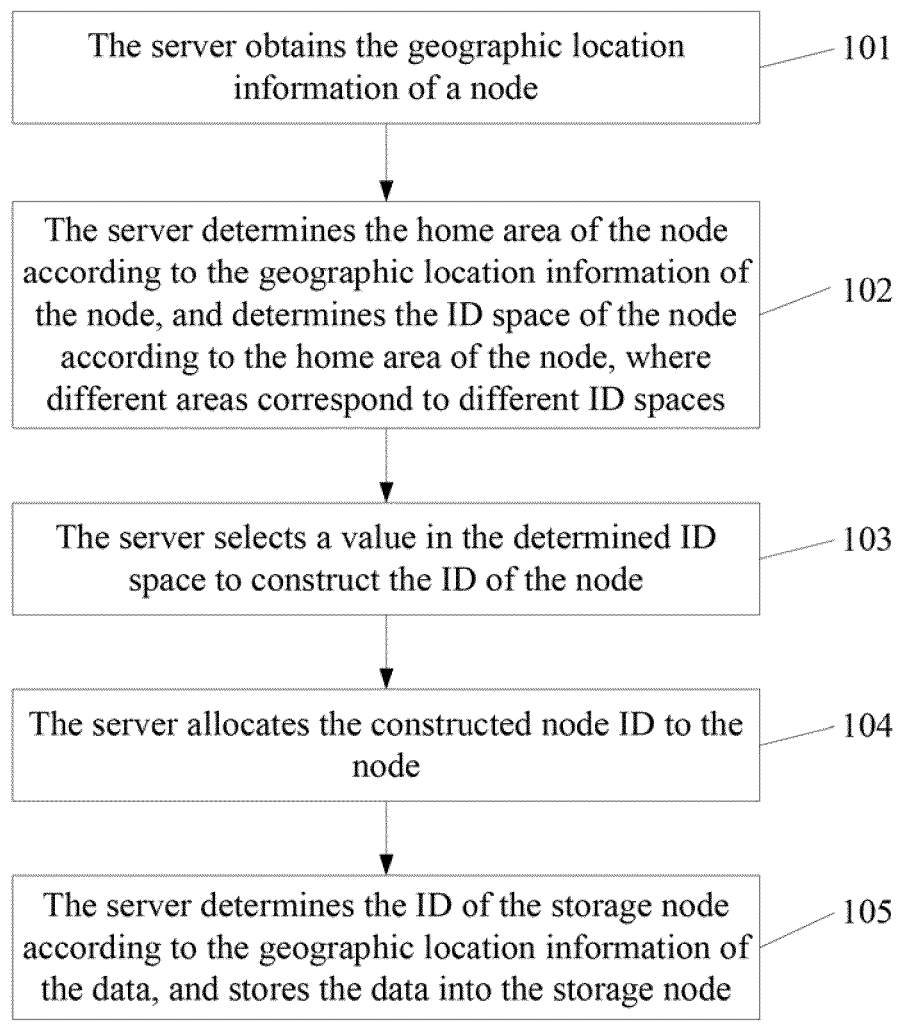
FIG. 1 is a flowchart of a distributed network construction method in a first embodiment of the disclosure.

As shown in FIG. 1, a distributed network construction method provided in this embodiment includes the following steps:

Step 101: The server obtains the geographic location information about a node.

The node declares its geographic location information when joining the distributed network, and therefore, the server can obtain the geographic location information about the node.

Step 102: The server determines the home area of the node according to the geographic location information about the node, and determines the ID space of the node according to the home area of the node, where different areas correspond to different ID spaces.

The server allocates an ID space to the network nodes in each area. The nodes in the same area correspond to the same ID space, while the nodes in different areas correspond to different ID spaces, and the nodes in the same area make up a local network. Therefore, the nodes on the same local network have the same ID space, and the nodes on different local networks correspond to different ID spaces. Because an area corresponds to an ID space uniquely, the home area of a node and the ID space corresponding to the area can be determined according to the geographic location information about the node.

Step 103: The server selects a value in the determined ID space to construct the ID of the node.

Selecting a value in the determined ID space may be: randomly selecting a value in the ID space corresponding to the area; or, if the ID space corresponding to the area is divided into ID subspaces, selecting an ID subspace first, and then selecting a value in the selected ID subspace randomly. The values in the ID space may be consecutive, or, the values in the ID subspace are consecutive but different ED subspaces in the same ID space are not consecutive. The selection of a value from an ID space or an ID subspace may allow for decentralized use of ID values. For example, when some values in an ID space have been selected for constructing the ID of the node and new values need to be selected from this ID space, the new values may be selected from the interval in which few values have been selected. In this way, the selection of values is more decentralized, and the load is more balanced in the subsequent data storage on the node.

Constructing the ID of the node may be: using the selected value as a prefix, a suffix, or a key field of the node ID, and then constructing the final node ID according to other attributes of the node, for example, performance parameters of the node, and history login records; or, using the selected value as the node ID directly.

Step 104: The server allocates the constructed node ID to the node.

The server sends the constructed node ID to the node, and stores the node ID on the server. In this way, the node ID is allocated.

Step 105: The server determines the ID of the storage node according to the geographic location information about the data, and stores the data into the storage node.

After a local network is set up through steps 101-104, if new data needs to be stored, the server may determine the ID of the node on the local network according to the geographic location information about the data, and the node that uploads the new data can store the new data into the node of the local network. The method for determining the ID of the storage node is described in other embodiments of the disclosure, and is not detailed herein.

With the method provided in this embodiment, when the node joins the distributed network, the ID of the node is determined according to the geographic location information about the node. Therefore, all nodes in the same area belong to the same ID range, and the IDs of nodes are allocated according to the area. Because the IDs of nodes are determined according to the area, the local data may be stored in the node in the area subsequently according to the geographic information, and thus reducing inter-area data access, reducing the data load on the backbone network and balancing the data traffic and the bandwidth overhead of the entire network. In this embodiment, when an ID space is divided into ID subspaces, different nodes are put into different ID subspaces, thus decentralizing the IDs of the nodes in the same area, and further balancing the data traffic and bandwidth overhead of the nodes on the local network, and homogenizing the data storage of the nodes.

Second Embodiment

Figure 2:
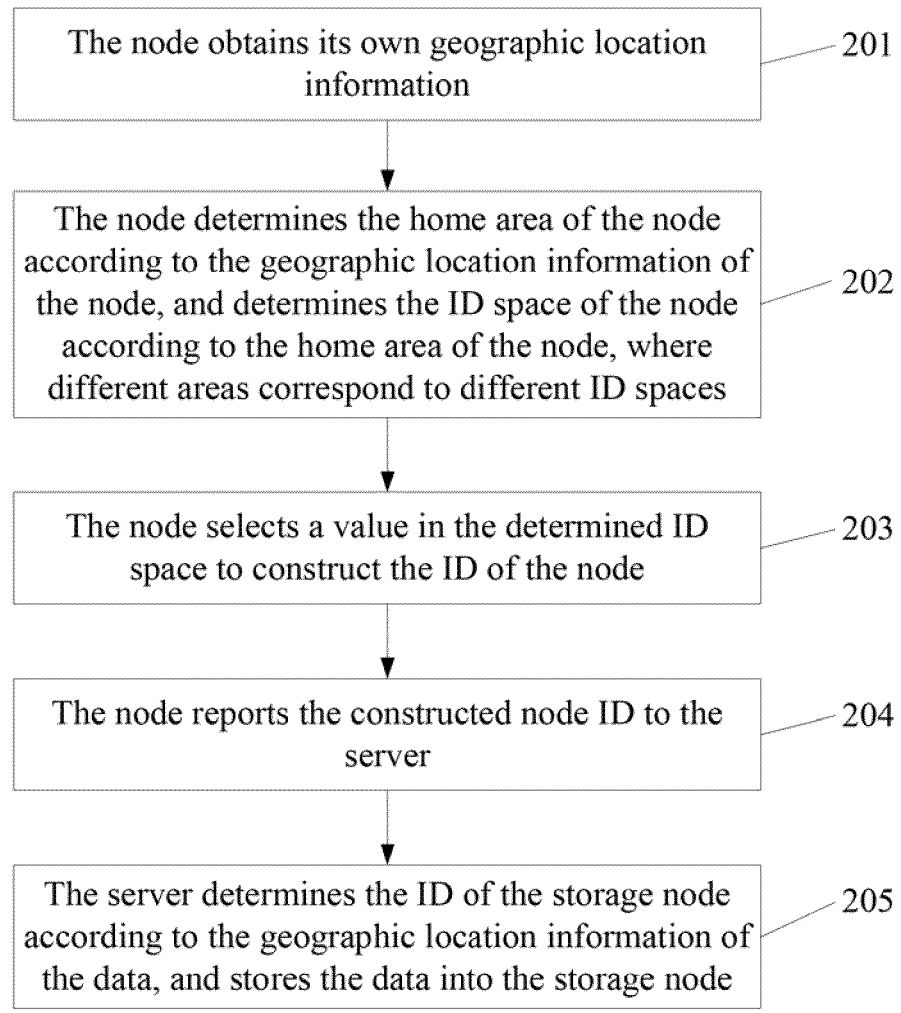
FIG. 2 is a flowchart of a distributed network construction method in a second embodiment of the disclosure.

As shown in FIG. 2, a distributed network construction method provided in this embodiment includes the following steps:

Step 201: The node obtains its own geographic location information.

The node declares its own geographic location information when joining the distributed network, and therefore, the node can know and obtain its own geographic location information.

Step 202: The node determines the home area of the node according to the geographic location information about the node, and determines the ID space of the node according to the home area of the node, where different areas correspond to different ID spaces.

The server allocates an ID space to the network nodes in each area. The nodes in the same area correspond to the same ID space, while the nodes in different areas correspond to different ID spaces, and the nodes in the same area make up a local network. Therefore, the nodes on the same local network have the same ID space, and the nodes on different local networks correspond to different ID spaces. Because an area corresponds to an ID space uniquely, the home area of the node and the ID space corresponding to the area can be determined according to the geographic location information about the node. The node may request the ID space corresponding to the geographic location information from the server according to the geographic location information about the node; or, because the ID space allocated to each area on the network is relatively fixed, the node may obtain the mode of allocating the ID space from the server or other nodes, and then determine the ID space of the node according to the geographic location information about the node and the mode of allocating the ID space.

Step 203: The node selects a value in the determined ID space to construct the ID of the node.

Selecting a value in the determined ID space may be: selecting a value in the ID space corresponding to the area randomly; or, if the ID space corresponding to the area is divided into ID subspaces, selecting an ID subspace first, and then selecting a value in the selected ID subspace randomly. The values in the ID space may be consecutive, or, the values in the ID subspace are consecutive but different ID subspaces in the same ID space are not consecutive. The selection of a value from an ID space or an ID subspace may allow for decentralized use of ID values. For example, when some values in an ID space have been selected for constructing the ID of the node and new values need to be selected from this ID space, the new values may be selected from the interval in which few values have been selected. In this way, the selection of values is more decentralized, and the load is more balanced in the subsequent data storage on the node.

Constructing the ID of the node may be: using the selected value as a prefix, a suffix, or a key field of the node ID, and then constructing the final node ID according to other attributes of the node; or, using the selected value as the node ID directly.

Step 204: The node reports the constructed node ID to the server.

The server receives the node ID constructed by the node, and stores the node ID. In this way, the node ID is allocated.

Step 205: The server determines the ID of the storage node according to the geographic location information about the data, and stores the data into the storage node.

After a local network is set up through steps 202-204, if new data needs to be stored, the node that uploads the new data may determine the ID of the node on the local network according to the geographic location information about the data. Therefore, the node that uploads the new data can store the new data into the node of the local network. The method for determining the ID of the storage node is described in other embodiments of the disclosure, and is not detailed herein.

With the method provided in this embodiment, when the node joins the distributed network, the ID of the node is determined according to the geographic location information about the node. Therefore, all nodes in the same area belong to the same ID range, and the node IDs are allocated according to the area. Because the node IDs are determined according to the area, the local data may be stored in the node in the area subsequently according to the geographic information, inter-area data access is reduced, the data load on the backbone network is reduced, and the data traffic and the bandwidth overhead of the entire network is balanced. In this embodiment, when an ID space is divided into ID subspaces, different nodes are put into different ID subspaces, thus decentralizing the IDs of the nodes in the same area, and further balancing the data traffic and bandwidth overhead of the nodes on the local network, and homogenizing the data storage of the nodes.

Third Embodiment

Figure 3:
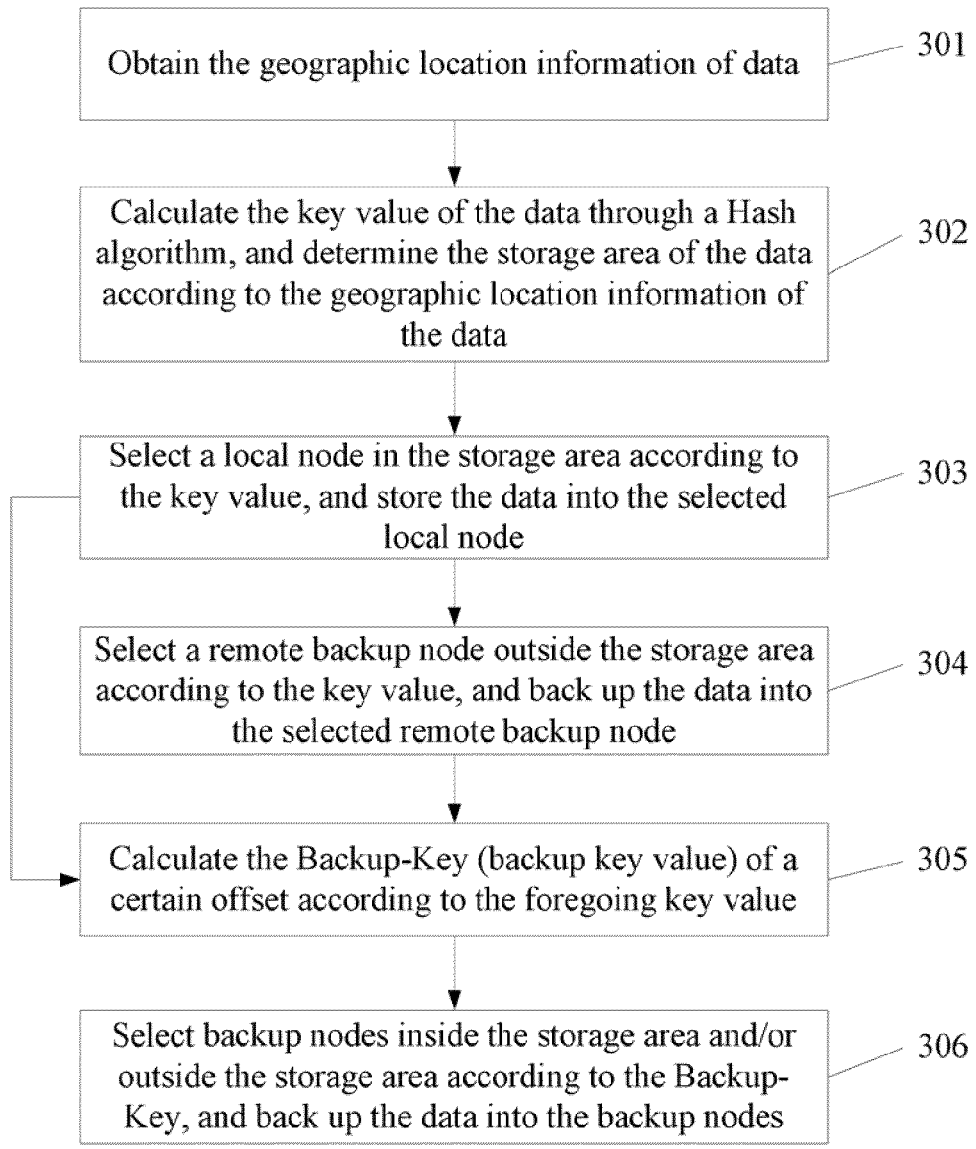
FIG. 3 is a flowchart of a distributed data storage method in a third embodiment of the disclosure.
Figure 4:
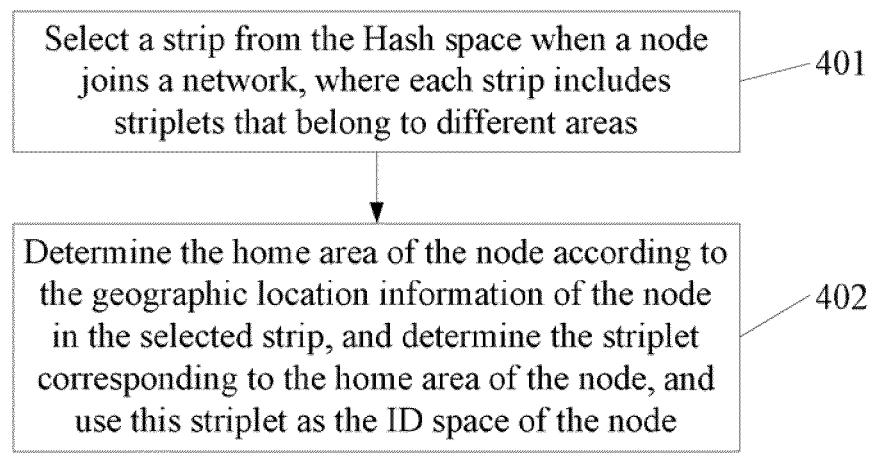
FIG. 4 is a flowchart of a method for determining the ID space of a node in a fourth embodiment of the disclosure.

As shown in FIG. 3, a distributed data storage method provided in this embodiment includes the following steps:

Step 301: Obtain the geographic location information about data.

The geographic location information about the data may be obtained through the node that uploads the data. Because the allocation of the node ID is based on areas and each area corresponds to an ID space uniquely, the ID space of the node ID may be determined according to the node ID, and the area corresponding to the ID space may be further determined. Thus, the geographic location information about the node is determined. For example, the detailed geographic location of a node can be deduced from a key field in a node ID according to the correspondence between the area and the ID space, and therefore, the node location information is obtained from the node ID. Once the geographic location information about the uploading node is obtained, the geographic location information about the data uploaded by the uploading node is obtained. The geographic location information about the data may also be carried in the data itself. For example, if the data is uploaded by a node in area A, but the data is provided for a node in area B, the data may carry the information about area B and the information about area is used as the geographic location information about the data. Therefore, the geographic location information about the data is obtained once the data is obtained if the geographic location information about the uploading node is different from the geographic location information carried in the data, a priority may be set. The priority decides whether to prefer the geographic location information carried in the data or the geographic location information about the uploading node.

Step 302: Calculate the key value of the data by using a Hash algorithm, and determine the storage area of the data according to the geographic location information about the data.

For each piece of data, a unique key value can be calculated out by using the corresponding Hash algorithm of the distributed network. Through Hash calculation of the data, the key value of the data can be calculated out. Meanwhile, the area corresponding to the geographic location information, namely, the home area of the data, may be determined according to the geographic location information about the data. The determined area is used as the storage area of the data. The node in the area may be used to store the data. The calculation of the key value of the data by using a Hash algorithm may occur before, during or after the determining of the storage area according to the geographic location information.

Step 303: Select a local node in the storage area according to the key value, and store the data into the selected local node.

Selecting a local node in the storage area according to the key value may be: selecting the node closest to the key value in the storage area, namely, the node which minimizes the absolute offset between the node ID and the key value among all nodes in the storage area; or, selecting the node sequentially closest to the key value in the storage area; or, selecting the node reversely closest to the key value in the storage area; or, selecting the node which is the next closest to the key value or in another fixed distance range. After the local node is selected in the storage area according to the key value, the data can be stored into the selected local node.

The distributed data storage method may further include step 304:

Step 304: Select a backup node outside the storage area according to the key value, and back up the data into the selected backup node. Through step 303, a local node on the local network (that is, the home area of the data) is selected as an active node for storing the data. To ensure the reliability and validity of the data, a node may be selected from the remote network (that is, outside the home area of the data) as a remote backup node for storing the data. Because the active node and the backup node store the same data, after one node fails, the data can still be obtained from the other node, thus ensuring reliability and validity of the data. With the data being stored on different networks (that is, local network and remote network), when the network in one area fails, the network in another area still works normally. In this way, the disaster recovery capability is further improved. Moreover, the data and its backup are on different networks, thus reducing the storage load of the local network as against the scenario of selecting both the active node and the backup node on the local network.

The distributed data storage method may further include step 305 and step 306:

Step 305: Calculate the Backup-Key (backup key value) of a certain offset according to the foregoing key value.

The Backup-Key is used to determine the backup node.

Step 306: Select backup nodes inside the storage area and/or outside the storage area according to the Backup-Key, and back up the data into the backup nodes.

Through step 303, a local node on the local network (the home area of the data) is selected as an active node for storing the data. Through step 305, after the Backup-Key corresponding to the backup data is determined, a local network (that is, the home area of the data) node and/or a global remote network (that is, outside the home area of the data) node is found according to the Backup-Key in step 306. The node selected on the local network according to the Backup-Key serves as a local backup node, and the node selected on the global remote network according to the Backup-Key serves as a remote backup node. When only one node is selected from the local network as a backup node, the reliability and the validity of data can be improved. Moreover, because the active node and the backup node are on the same local network, the data is stored in duplicate (on the active node and the backup node) on the local network where data is exchanged most frequently, and the data can be searched out quickly. When only one node is selected from the remote network as a backup node, the backup node can work normally in the case that the local network fails. This improves the disaster recovery capability of the data. When a node is selected from the local network as a local backup node and another node is selected from the remote network as a remote backup node, the data is stored in duplicate on the local network where data is exchanged most frequently, and the data is also backed up on the remote network to improve the disaster recovery capability of the data. In the actual process of using data, the data stored locally in duplicate can be read quickly; when the local network fails, the remote backup data on the remote network can be read. In this way, the disaster recovery effect is achieved.

In this embodiment, the operations in steps 301-306 can be performed by the data uploading node, or by the server according to the information about the data uploading node. Afterward, the determined information about the node for storing the data is sent to the uploading node so that the uploading node can send data to the storage node.

In step 305, two different offsets can be calculated according to the foregoing key to obtain a LocalBackup-Key and a RemoteBackup-Key. The LocalBackup-Key is used to determine the local backup node, and the RemoteBackup-Key is used to determine the remote backup node. In step 306, according to the LocalBackup-Key, a node is selected from the storage area as a local backup node for backing up the data; according to the Remote Backup-Key, a node is selected outside the storage area as a remote backup node for backing up the data. In this way, the IDs of the nodes for storing the data are further decentralized, and the data traffic and the bandwidth overhead are further balanced among the network links and the nodes.

Selecting a node according to the key value may be: selecting the node which minimizes the absolute difference between the node ID and the key value among a certain range of nodes (that is, remote network or local network, or entire network); or, selecting the node whose ID is sequentially closest to the key value; or, selecting the node whose ID is reversely closest to the key value; or, selecting the node whose ID is in a fixed range of distance from the key value; or, selecting the node whose ID is next closest to or closer to the key value. The embodiments of the disclosure do not limit the mode of selecting the node according to the key value.

With the method provided in this embodiment, before the data is stored, a node is selected for storing the data according to the geographic location information about the data. Therefore, the data is stored according to its geographic location information. The local data can be stored in the node within the area according to the geographic location information, thus reducing inter-area data access, reducing the data load on the backbone network and balancing the data traffic and the bandwidth overhead of the entire network. In this embodiment, a backup node may be selected from the local network and/or the remote network, thus further improving the disaster recovery capability of the network; the local backup node and the remote backup node may be obtained according to different offsets relative to the key value, thus further balancing the data traffic and the bandwidth overhead among all the network links and nodes, balancing the load of the entire distributed network, and improving the performance of the entire network.

Fourth Embodiment

This embodiment provides a method for determining the ID space of a node. The determining method is applicable to selecting an ID space of the node in the foregoing embodiments, for example, step 102 in the first embodiment, and step 202 in the second embodiment. The method for determining the ID space of a node includes the following steps:

Step 401: Select a strip from the Hash space when a node joins a network, where each strip includes striplets that belong to different areas.

Figure 5:
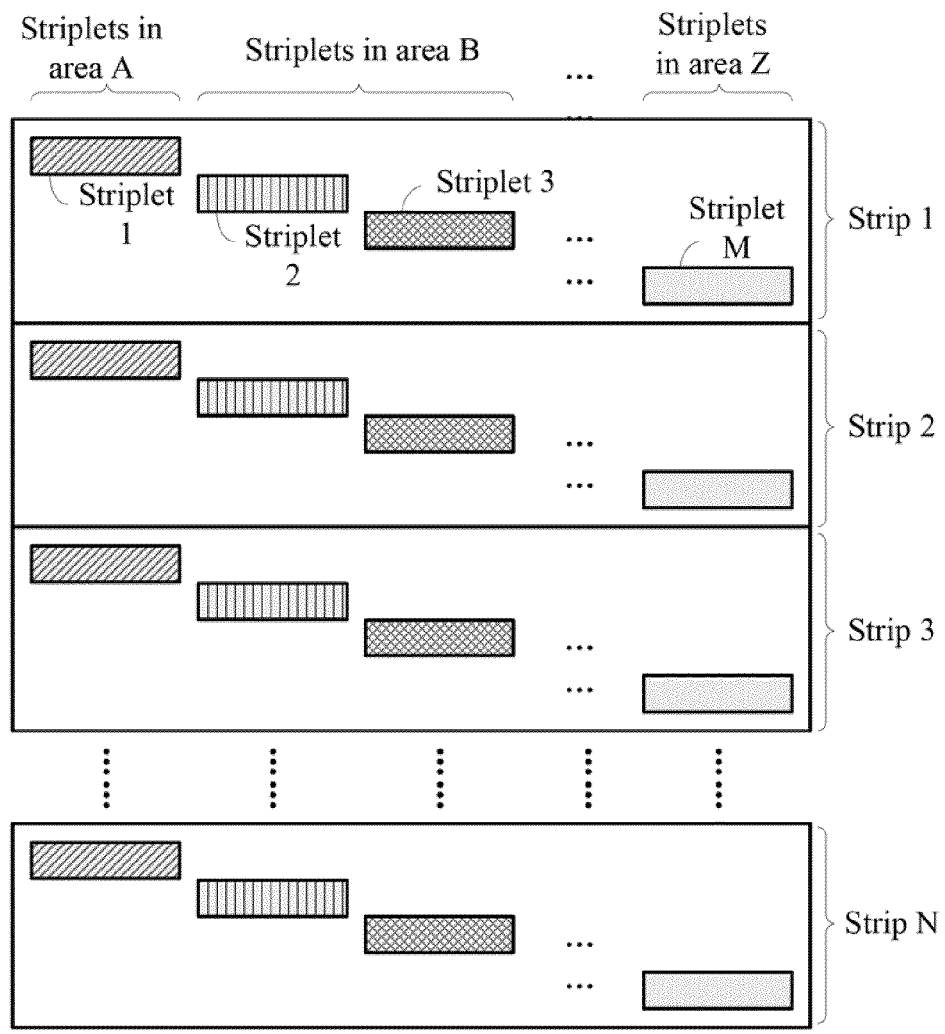
FIG. 5 shows division of a Hash space into strips in a fourth embodiment of the disclosure.

Before allocation, the Hash space is divided into strips. As shown in FIG. 5, for ease of description, the Hash space is divided into N strips: strip 1, strip 2, . . . , strip N; and each strip includes M striplets: striplet 1, striplet 2, . . . , striplet M, where M and N are natural numbers. Each striplet includes one or more Hash values. The striplets in each column belong to the same area, and each area may include one or more columns of striplets. For example, striplets 1 in all strips belong to area A; and striplets 2 and striplets 3 in all the strips belong to area B. Through the division mode in FIG. 5, the entire Hash space is divided into N*M striplets geographically. In the division, the quantity of striplets in one strip may be different from the quantity of striplets in another strip if the quantity of striplets in each strip is greater than or equal to the quantity of areas. If the quantity of striplets in a strip is greater than the quantity of areas, some idle striplets may be reserved. The entire Hash space may be divided into N strips averagely, and each strip has the same space size and includes the same quantity of Hash values.

Selecting a strip from the Hash space may be: selecting a strip randomly from the strips of the Hash space, or selecting a strip from the strips that are not used before, or selecting a least used strip. Selecting a strip that is not used before or a strip that is least used can decentralize the IDs of the node as far as possible, equalize the allocated node IDs among the strips, make the intervals of the node IDs more even, and balance the load among the nodes.

Step 402: Determine the home area of the node according to the geographic location information about the node in the selected strip, and determine the striplet corresponding to the home area of the node, and use this striplet as the ID space of the node.

Each area corresponds to different striplets. Therefore, after a strip is selected, the striplet of the area corresponding to the geographic location information about the node may be selected from the striplets in the strip, and then the striplet is used as the ID space of the node. Subsequently, a value is selected from the ID space to construct the ID of the node. Therefore, the ID spaces of the nodes in the same area belong to the striplets corresponding to the area, and the node IDs in the same area are of common characteristics. Further, through the strip division rule, the detailed geographic location of the node may be deduced from the ID value of the node, and the user location information is obtained from the node ID.

The following instance is an exemplary process of determining the node ID by dividing the space into strips. For example, if Shenzhen belongs to area B in the rules of setting the node ID, when a node in Shenzhen joins the network, the node selects a strip from the Hash space randomly, finds the striplet in the Hash number range in area B from the strip, and selects a Hash number randomly as a prefix (or a suffix, or a key field) of its node ID from the Hash range, and may construct the final node ID according to other attributes of the node. Through the mechanism of selecting an ID through strip division, some key fields (such as the field that includes the Hash number) in a node ID may be used together with the strip division rule to deduce the detailed geographic location of the node. Therefore, the user location information is obtained from the node ID.

Figure 6:
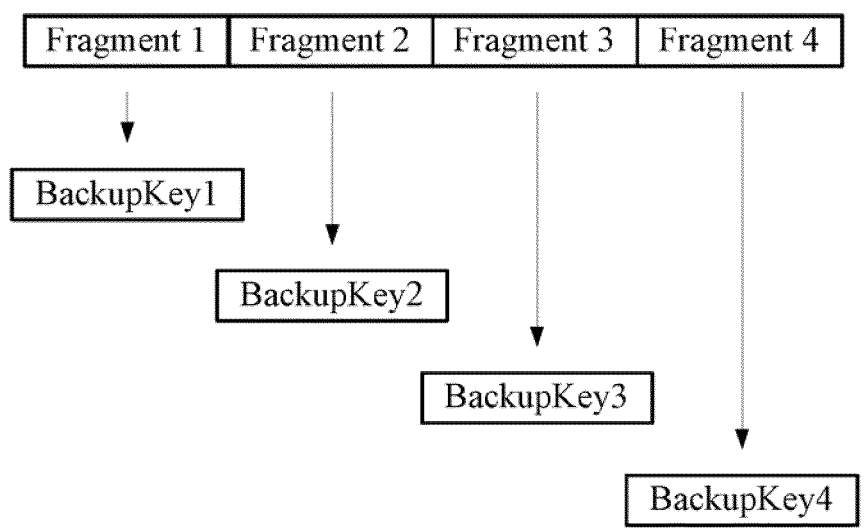
FIG. 6 shows division of a strip into striplets and the offset in the fourth embodiment of the disclosure.

After the entire Hash space is divided into strips and divided into striplets in this embodiment, a striplet may be further split into segments. Different striplet segments correspond to different offsets, and therefore, the calculated Backup-Key values are as decentralized as possible. In the distributed data storage method in this embodiment, step 305 may further include two steps: step 3051 for determining the striplet segment of the key value, and step 3052 for calculating the Backup-Key according to the key value and the offset corresponding to the determined striplet segment. The extent of decentralization of the Backup-Key may be determined by setting a minimum offset (min_offset) and a maximum offset (max_offset). For example, on a network with at least four nodes, the min_offset may be defined as ¼ of the space, and max_offset may be defined as ¾ of the space. In this way, the calculated Backup-Key values are as decentralized as possible, while it is ensured that the local backup node corresponding to the generated Backup-Key value is not a duplicate of the active node. As shown in FIG. 6, a striplet is split into four segments, namely, fragment 1, fragment 2, fragment 3, and fragment 4. The range of the values included in each fragment may be the same or different. For fragment 1, the set offset is ¼ of the space; for fragment 2, the set offset is ½ of the space; for fragment 3, the set offset is ⅜ of the space; and, for fragment 4, the set offset is ⅝ of the space. When the key falls within the space range of fragment 1, Backup-Key1=key+¼ space; when the key falls within the space range of fragment 2, Backup-Key2=key+½ space; when the key falls within the space range of fragment 3, Backup-Key3=key+⅜ space; by analogy, if there are n nodes, namely, if the system includes at least n nodes, the min_offset may be set to 1/n of the space, and the max_offset may be set to (n−1)/n of the space. Different offsets are set for different striplet fragments. The space range refers to the entire Hash space range of the distributed network. After the striplets are split into fragments, the data may be recovered from multiple nodes in the case of data recovery, and multiple nodes share the recovery traffic. For example, when the key of the data falls within the Hash value space of the first striplet, its data is stored on the first node. Therefore, when the key values of different data fall within multiple striplet fragments of the first striplet, the different data is stored in the first node, and is backed up to different nodes through different offsets. Therefore, when the first node recovers from failure, the data may be recovered from different backup nodes concurrently, thus sharing the recovery traffic and improving the recovery speed.

With the method provided in this embodiment, each area may include multiple striplets, and different areas correspond to different striplets. Therefore, the nodes in each area belong to the same ID range (namely, multiple striplets included in this area). The Hash space is divided into strips, and each strip includes the striplets corresponding to each area. In the process of selecting the ID space, the strip is selected first, and then the corresponding striplets are determined according to the geographic location information. Therefore, the node IDs of the Hash space can be distributed evenly according to the geographic area location. The nodes in the area are allocated by the strip into each striplet almost averagely. If the strip quantity is greater, the nodes are more decentralized. When the strip quantity (N) of the entire network is great enough, the nodes on the network can be as sparse as required. All nodes in the same geographic area are distributed evenly in the ID range of the area, and the ID range is equally divided into their own node IDs. In this way, it is possible that only one node exists in a striplet area range in a strip. Therefore, the IDs of the nodes are distributed evenly, and the data is stored evenly, while the network load is balanced. Moreover, the allocation of the node IDs is based on the strip division. Therefore, the geographic location information about a node can be deduced according to the node ID, and the correlation between the node ID and the geographic location information about the node is set up.

Fifth Embodiment

Figure 7:
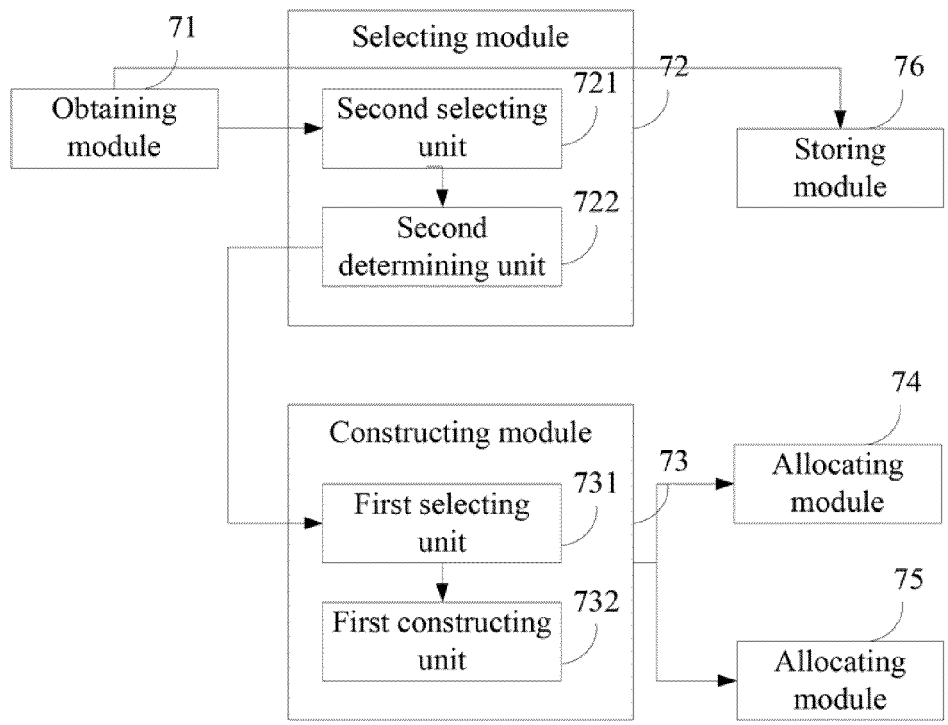
FIG. 7 shows a structure of a distributed network construction apparatus in a fifth embodiment of the disclosure.

As shown in FIG. 7, a distributed network construction apparatus provided in this embodiment includes:

an obtaining module 71, adapted to obtain the geographic location information about a node;

a selecting module 72, adapted to determine the home area of the node according to the geographic location information about the node obtained by the obtaining module 71, and determine the ID space of the node according to the home area of the node, where different areas correspond to different ID spaces; and a constructing module 73, adapted to select a value in the ID space determined by the selecting module 72 to construct the ID of the node.

Optionally, the constructing module 73 includes: a first selecting unit 731, adapted to select an ID subspace in the ID space determined by the selecting module 72, where the ID space is divided into ID subspaces; and a first constructing unit 732, adapted to select a value in the selected ID subspace selected by the first selecting unit 731 to construct the ID of the node. The functions of the constructing module 73 may be implemented by the ID selection method and the node ID construction method in the first embodiment and the second embodiment, as described in step 103 in the first embodiment and step 203 in the second embodiment.

Optionally, the selecting module 72 includes: a second selecting unit 721, adapted to select a strip from the Hash space of the network, where each strip includes striplets that belong to different areas; and a second determining unit 722, adapted to determine the home area of the node according to the geographic location information about the node in the strip selected by the second selecting unit 721, and determine the striplet corresponding to the home area of the node, and use this striplet as the ID space of the node. The functions of the selecting module 72 may be implemented by the ID space determining method in the first, second and fourth embodiments, as described in step 102 of the first embodiment, step 202 in the second embodiment and the fourth embodiment.

In this embodiment, the distributed network construction apparatus may be a node on the distributed network, for example, a common node or a server. When the apparatus in this embodiment is a server, the apparatus may further include an allocating module 74, which is adapted to allocate the node ID constructed by the constructing module 73 to the node. When the apparatus in this embodiment is a newly added common node, the apparatus may further include a reporting module 75; which is adapted to report the node ID constructed by the constructing module 73 to the server.

Optionally, the foregoing apparatus may further include a storage module 76, which is adapted to: determine the ID of the storage node according to the geographic location information about the data, and store the data into the storage node.

With the apparatus in this embodiment, when the node joins the distributed network, the ID of the node is determined according to the geographic location information about the node. Therefore, all nodes in the same area belong to the same ID range, and the node IDs are allocated according to the area. Because the node IDs are determined according to the area, the local data may be stored in the node in the area subsequently according to the geographic information, inter-area data access is reduced, the data load on the backbone network is reduced, and the data traffic and the bandwidth overhead of the entire network is balanced. In this embodiment, when an ID space is divided into ID subspaces, different nodes are put into different ID subspaces, thus decentralizing the IDs of the nodes in the same area, and further balancing the data traffic and bandwidth overhead of the nodes on the local network, and homogenizing the data storage of the nodes.

Sixth Embodiment

Figure 8:
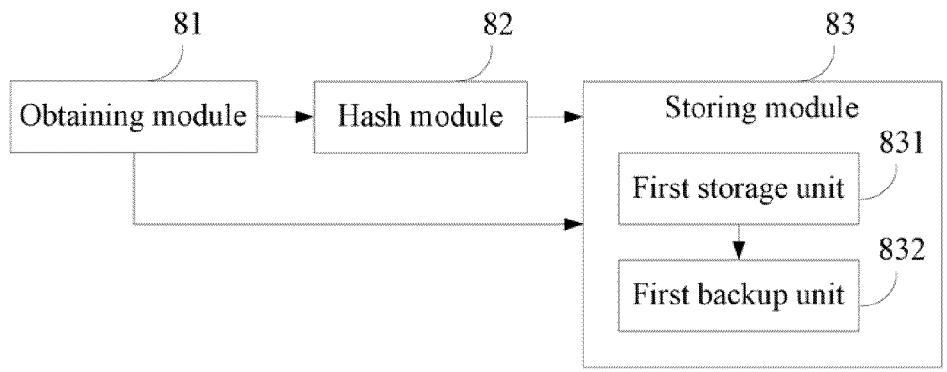
FIG. 8 shows a structure of a distributed data storage apparatus in a sixth embodiment of the disclosure.

As shown in FIG. 8, a distributed data storage apparatus provided in this embodiment includes:

an obtaining module 81, adapted to obtain geographic location information about data, and determine the storage area of the data according to the geographic location information;

a Hash module 82, adapted to calculate the key value of the data by using a Hash algorithm;

a storage module 83, adapted to: select a local node in the storage area determined by the obtaining module 81 according to the key value calculated by the Hash module 82, and store the data into the local node.

Optionally, the storage module 83 includes:

a first storage unit 831, adapted to: select a local node in the storage area determined by the obtaining module 81 according to the key value calculated by the Hash module 82, and store the data into the local node; and a first backup unit 832, adapted to: select a backup node outside the storage area determined by the obtaining module 81 according to the key value calculated by the Hash module 82, and backup the data into the remote backup node.

Optionally, the storage module 83 includes:

a first storage unit 831, adapted to: select a local node in the storage area determined by the obtaining module 81 according to the key value calculated by the Hash module 82, and store the data into the local node; and a first backup unit 832, adapted to: calculate the backup key value of the offset according to the key value calculated by the Hash module 82, select a backup node inside the storage area and/or a backup node outside the storage area determined by the obtaining module 81 according to the backup key value, and backup the data into the backup nodes.

Optionally, the storage module 83 includes:

a first storage unit 831, adapted to: select a local node in the storage area determined by the obtaining module 81 according to the key value calculated by the Hash module 82, and store the data into the local node; and a first backup unit 832, adapted to: calculate different offsets according to the key value calculated by the Hash module 82 to obtain the first backup key value and the second backup key value, select a local backup node in the storage area determined by the obtaining module 81 according to the first backup key value, select a backup node outside the storage area according to the second backup key value, and backup the data into the local backup node and the remote backup node.

Optionally, the first backup unit 832 includes:

a second fragment unit, adapted to determine the striplet segment corresponding to the key value according to the key value calculated by the Hash module 82, where different fragments of the same striplet correspond to different offsets;

a second offset unit, adapted to calculate the backup key value according to the key value and the offset corresponding to the striplet fragment determined by the second fragment unit; and a second backup unit, adapted to: select a backup node in the storage area and/or a backup node outside the storage area determined by the obtaining module 81 according to the backup key value calculated by the second offset unit, and backup the data into the backup nodes.

In this embodiment, the distributed data storage apparatus may be a node on the distributed network.

Through the apparatus provided in this embodiment, before the data is stored, a node is selected for storing the data according to the geographic location information about the data. Therefore, the data is stored according to its geographic location information. The local data can be stored in the node within the area according to the geographic location information, thus reducing inter-area data access, reducing the data load on the backbone network and balancing the data traffic and the bandwidth overhead of the entire network. In this embodiment, a backup node may be selected from the local network and/or the remote network, thus further improving the disaster recovery capability of the network: the local backup node and the remote backup node may be obtained according to different offsets relative to the key value, thus further balancing the data traffic and the bandwidth overhead among all the network links and nodes, balancing the load of the entire distributed network, and improving the performance of the entire network.

Seventh Embodiment

Figure 9:
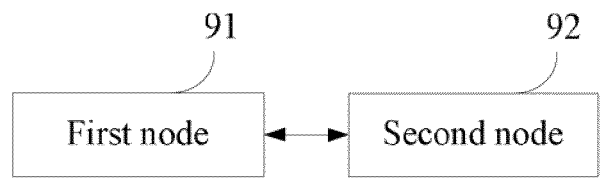
FIG. 9 shows a structure of a distributed network system in a seventh embodiment of the disclosure.

As shown in FIG. 9, a distributed network system provided in this embodiment includes:

a first node 91, adapted to: obtain the geographic location information about the first node itself or another node, determine the home area of the node according to the geographic location information, and determine the ID space of the node according to the home area of the node, where different areas correspond to different ID spaces; and select a value in the determined ID space to construct the ID of the node.

Optionally, the distributed network system further includes:

a second node 92, adapted to obtain the geographic location information about the data, determine the storage area of the data according to the geographic location information, calculate the key value of the data by using a Hash algorithm, select the node closest to the key value in the storage area, and store the data into the node.

The functions of the first node 91 and the second node 92 may be integrated into a distributed node. Each node on the distributed network can provide the functions of the first node 91 and the second node 92. Optionally, the first node 91 may be a distributed network construction apparatus in the fifth embodiment, or may be such an apparatus in addition to other common functional modules. Optionally, the second node 92 may be a distributed data storage apparatus in the sixth embodiment, or may be such an apparatus in addition to other common functional modules.

Through the system provided in this embodiment, when the node joins the distributed network, the ID of the node is determined according to the geographic location information about the node. Therefore, all nodes in the same area belong to the same ID range, and the node IDs are allocated according to the area. Because the node IDs are determined according to the area, the local data may be stored in the node in the area subsequently according to the geographic information, inter-area data access is reduced, the data load on the backbone network is reduced, and the data traffic and the bandwidth overhead of the entire network is balanced.

It is understandable to those skilled in the art that all or part of the steps of the foregoing method embodiments may be implemented by hardware instructed by a computer program. The program may be stored in a computer-readable storage medium. When being executed, the program performs the processes covered in the foregoing method embodiments. The storage medium may be a magnetic disk, a compact disk, a Read-Only Memory (ROM), or a Random Access Memory (RAM).

Although the invention has been described through several exemplary embodiments, the invention is not limited to such embodiments. It is apparent that those skilled in the art can make modifications and variations to the invention without departing from the scope of the invention. The invention is intended to cover the modifications and variations provided that they fall in the scope of protection defined by the following claims or their equivalents.

What is claimed is:

1. A distributed data storage method, comprising:
   obtaining geographic location information about data;
   determining a storage area of the data according to the geographic location information and calculating a key value of the data;
   selecting a local node in the storage area according to the key value; and
   storing the data into the local node;
   calculating a Backup-Key of a certain offset according to the key value; and
   selecting backup nodes inside the storage area or outside the storage area according to the Backup-Key and backing up the data into the backup nodes; and
   before calculating a Backup-Key of a certain offset according to the key value:
   determining a striplet segment of the key value, wherein different striplet segments correspond to different offsets; and
   calculating the Backup-Key according to the key value and the offset corresponding to the determined striplet segment;
   wherein the local node is included in a distributed network, and the distributed network is constructed based on the geographic location information about the node, wherein a home area of the node in the distributed network is determined according to the geographic location information about the node by determining an ID of the local node according to the geographic location information; wherein different areas correspond to different ID spaces.

2. A distributed data storage method, comprising:
   obtaining geographic location information about data;
   determining a storage area of the data according to the geographic location information and calculating a key value of the data;
   selecting a local node in the storage area according to the key value; and
   storing the data into the local node;
   obtaining a first backup key value and a second backup key value according to different offsets;
   selecting a local backup node in the storage area according to the first backup key value;
   selecting a backup node outside the storage area according to the second backup key value; and
   backing up the data into the local backup node and the remote backup node;
   wherein the local node is included in a distributed network, and the distributed network is constructed based on the geographic location information about the node, wherein a home area of the node in the distributed network is determined according to the geographic location information about the node by determining an ID of the local node according to the geographic location information; wherein different areas correspond to different ID spaces.

3. A distributed data storage apparatus, wherein the data storage apparatus is a hardware-based node on a distributed network, the distributed data:
   an obtaining module, adapted to obtain geographic location information about data and determine a storage area of the data according to the geographic information about the data;
   a Hash module, adapted to calculate a key value of the data; and
   a storage module, adapted to select a local node in the storage area determined by the obtaining module according to the key value and to store the data into the local node;
   wherein the apparatus is in a distributed network, and the distributed network is constructed based on the geographic location information about the data, wherein a home area of the apparatus in the distributed network is determined according to the geographic location information about the data by determining an ID of the local node according to the geographic location information, wherein different areas correspond to different ID spaces;
   wherein the storage module comprises a first backup unit adapted to:
   calculate a backup key value of an offset according to the key value calculated by the Hash module;

select a backup node inside the storage area and/or a backup node outside the storage area determined by the obtaining module according to the backup key value; and backup the data into one or more backup nodes;

wherein the first backup unit comprises:

a second fragment unit, adapted to determine a striplet segment corresponding to the key value according to the key value calculated by the Hash module, wherein different fragments of the same striplet correspond to different offsets;

a second offset unit, adapted to calculate the backup key value according to the key value and the offset corresponding to the striplet fragment determined by the second fragment unit; and a second backup unit, adapted to select a backup node in the storage area and/or a backup node outside the storage area determined by the obtaining module according to the backup key value calculated by the second offset unit, and back up the data into one or more backup nodes.

4. A distributed data storage apparatus, wherein the data storage apparatus is a hardware-based node on a distributed network, comprising:

an obtaining module, adapted to obtain geographic location information about data and determine a storage area of the data according to the geographic information about the data;

a Hash module, adapted to calculate a key value of the data; and a storage module, adapted to select a local node in the storage area determined by the obtaining module according to the key value and to store the data into the local node;

wherein the apparatus is in a distributed network, and the distributed network is constructed based on the geographic location information about the data, wherein a home area of the apparatus in the distributed network is determined according to the geographic location information about the data by determining an ID of the local node according to the geographic location information, wherein different areas correspond to different ID spaces;

wherein the storage module comprises a first backup unit, adapted to:

calculate different offsets according to the key value calculated by the Hash module to obtain a first backup key value and a second backup key value, select a local backup node in the storage area determined by the obtaining module according to the first backup key value, select a remote backup node outside the storage area according to the second backup key value, and backup the data into the local backup node and the remote backup node.

* * * * *

UNITED STATES PATENT AND TRADEMARK OFFICE
CERTIFICATE OF CORRECTION

| | |
|---|---|
| PATENT NO. | : 8,645,433 B2 |
| APPLICATION NO. | : 12/639667 |
| DATED | : February 4, 2014 |
| INVENTOR(S) | : Shi et al. |

It is certified that error appears in the above-identified patent and that said Letters Patent is hereby corrected as shown below:

In the Claims:

Column 14, Claim 3, line 44 "the distributed data:" should read

--the distributed data storage apparatus comprising:--.

Signed and Sealed this
Thirteenth Day of May, 2014

Michelle K. Lee
*Deputy Director of the United States Patent and Trademark Office*